United States Patent [19]

Sakata et al.

[11] Patent Number: 4,530,415
[45] Date of Patent: Jul. 23, 1985

[54] POWER TRANSMISSION DEVICE FOR FRONT-ENGINE FRONT-DRIVE CAR

[75] Inventors: Mamoru Sakata, Ooizumigakuen; Masaaki Minakawa, Tokyo, both of Japan

[73] Assignee: Honda Giken Kogyo Kabushiki Kaisha, Tokyo, Japan

[21] Appl. No.: 428,646

[22] Filed: Sep. 30, 1982

[30] Foreign Application Priority Data

Mar. 24, 1982 [JP] Japan ................................. 57-46968

[51] Int. Cl.³ ............................................. B60K 17/30
[52] U.S. Cl. .................................... 180/297; 180/256
[58] Field of Search ....................... 180/297, 291, 256; 464/113, 140

[56] References Cited

U.S. PATENT DOCUMENTS 3,399,743 9/1968 Hetmann .................... 180/297 X
3,580,350 5/1971 Duntov .................... 180/297 X

FOREIGN PATENT DOCUMENTS 138235 10/1979 Japan ................................. 180/297
144626 11/1979 Japan ................................. 180/297

Primary Examiner—Joseph F. Peters, Jr.
Assistant Examiner—Michael Mar
Attorney, Agent, or Firm—Armstrong, Nikaido, Marmelstein & Kubovcik

[57] ABSTRACT

A power transmission device for a front-engine front-drive car having right and left drive shafts different in length from each other. The turning moments applied to right and left front wheels when the car is accelerated are made equal to each other by making the descent angles of the drive shafts respectively substantially equal to each other. Moreover, the allowable steering angle ranges of the right and left front wheels can be widened by allowing the angles made between the right and left drive shafts and the common axis of the right and left front wheels respectively to be substantially equal to each other as viewed in a plan view.

8 Claims, 6 Drawing Figures

POWER TRANSMISSION DEVICE FOR FRONT-ENGINE FRONT-DRIVE CAR

BACKGROUND OF THE INVENTION

1. Field of the Invention

The present invention relates to a power transmission device for a front-engine front-drive car, and more particularly, to a power transmission device for a small car wherein an engine is laterally installed in the front part of the car and the power is transmitted to front wheels by means of right and left drive shafts different in length from each other.

2. Description of the Prior Art

There is a steady increase in number of front-engine front-drive type small cars having their engines laterally installed in order to minimize the length of their engine rooms in the front parts of the cars. By the way, it is general that a power transmission device having a transmission, which is directly connected to a crankshaft, integrally assembled on the side of an engine is employed in also the cars of this type. In such cars, it is almost impossible to position the final gear of the counter gear of the transmission on the longitudinal centre plane of the car body. Consequently, a differential gear mechanism to be engaged with the final gear has to be also installed at a position laterally offset from the longitudinal center plane of the car body. Therefore, it is inevitable in such a front-engine front-drive car with its engine laterally installed that there is a difference in length between drive shafts connected between the output shaft of the differential gear mechanism and right and left front wheels respectively.

FIG. 1 is a rear elevation of the front wheel part of a conventional car of this type, particularly showing its power transmission device. As shown in the figure, a differential gear mechanism 1 is usually horizontally installed together with an engine 2 and a transmission 3. In addition, an output shaft center line 4 thereof is at a position higher than a common axis 7 of left and right front wheels 5, 6. Therefore, the descent angle $\alpha_L$ of a longer drive shaft 8, i.e., the angle made between the drive shaft 8 and a horizontal plane is smaller than the descent angle $\alpha_R$ of a shorter drive shaft 9 as viewed in a rear elevation. It is, however, inevitable that such a difference between the descent angles $\alpha_L$, $\alpha_R$ of the left and right drive shafts 8, 9 causes a difference to be also produced between the moments $M_L$, $M_R$ applied to the left and right front wheels 5, 6. The larger the descent angle of the drive shaft, the larger the turning moment. Therefore, $M_R$ becomes larger than $M_L$, and the steering wheel is undesirably forcedly directed toward the longer drive shaft 8.

On the other hand, FIG. 2 is a plan view of the power transmission device shown in FIG. 1. As shown in the figure, it is usual that the engine 2 and the transmission 3 are disposed in front of the front wheels 5, 6 and the output shaft center line 4 of the differential gear mechanism 1 is in front of the common axis 7 of the left and right front wheels 5, 6. Therefore, the angle $\beta_R$ made between the shorter drive shaft 9 and the axis 7 is larger than the angle $\beta_L$ made between the longer drive shaft 8 and the axis 7 as viewed in a plan view. Consequently, when the steering wheel is turned, there is produced a difference between the angle made between the drive shaft 8 and an axle 12 of the front wheel 5 and the angle made between the drive shaft 9 and an axle 13 of the front wheel 6.

By the way, even speed couplings 14, 15 are provided between the drive shafts 8, 9 and the axles 12, 13 respectively in order to transmit power to the front wheels 5, 6 as well as enable the front wheels 5, 6 to rotate about the kingpin axes 10, 11 so that the car can be steered. Such even speed couplings generally have given allowable ranges in the axis crossing angle respectively. Accordingly, the maximum steering angles of the front wheels 5, 6 are restricted by the ranges within which the even speed couplings 14, 15 allow the axial angles between the drive shafts 8, 9 and the axles 12, 13, i.e., the allowable swing angle ranges of the even speed couplings 14, 15 respectively.

When the steering wheel is turned, there are large changes in the angles made between the drive shafts 8, 9 and the axles 12, 13 respectively as viewed in a plan view. Consequently, when the angle $\beta_R$ made between the right drive shaft 9 and the axis 7 as viewed in a plan view is large as shown in FIG. 2, the allowable swing angle range of the right front wheel 6 becomes small when the steering wheel is turned counterclockwise, so that both the steering angles of the left and right front wheels 5, 6 are restricted within small limits. In other words, it becomes impossible to make the most of the allowable swing angle ranges of the even speed couplings 14, 15 respectively. Consequently, the steering wheel turning angle is small and the minimum turning radius of the car inevitably becomes large.

SUMMARY OF THE INVENTION

It is, therefore, an object of the present invention to provide a power transmission device for a front-engine front-drive car allowing a stable traveling by preventing the steering wheel from being undesirably forcedly turned when the car is accelerated, while employing the right and left drive shafts different in length from each other.

To this end, according to the present invention, the output shaft center line of the differential gear mechanism is vertically inclined so that the descent angles of the right and left drive shafts are made substantially equal to each other.

Another object of the present invention is to provide a power transmission device for a front-engine front-drive car capable of making the most of the allowable swing angle ranges of the even speed couplings while employing the right and left drive shafts different in length from each other, thereby to reduce the restrictions on the maximum steering angles so that the steering wheel turning angle becomes larger while the minimum turning radius becomes smaller.

To this end, according to the present invention, the output shaft center line of the differential gear mechanism is longitudinally inclined so that the right and left drive shafts and the common axis of the angles of inclination between the right and left front wheels are made equal to each other respectively as viewed in a plan view.

Still another object of the present invention is to provide a power transmission device for a front-engine front-drive car capable of simultaneously attaining the above-mentioned two objects.

A further object of the present invention is to provide a power transmission device for a front-engine front-drive car capable of attaining each of the above-mentioned objects without specially changing the support structure for the engine and other parts.

To this end, according to a form embodying the present invention, the power unit proper comprising an engine and a transmission is horizontally installed, and only the output shaft center line of the differential gear mechanism is vertically inclined with respect to the power unit proper. In this case, it is possible to employ a helical gear, which is generally used for gear transmission mechanisms, as each of the final gear of the counter gear of the transmission and the final driven gear of the differential gear mechanism.

Moreover, it is also possible that the power unit proper is installed so as to be parallel with the common axis of the right and left front wheels as viewed in a plan view, and only the output shaft center line of the differential gear mechanism is longitudinally inclined with respect to the power unit proper. In this case, it is possible to employ a quite ordinary bevel gear as each of the final gear of the counter gear of the transmission and the final driven gear of the differential gear mechanism.

Furthermore, most preferably, the power unit proper is installed in the horizontal lateral direction, i.e., in parallel with the axis, and the output shaft center line of the differential gear mechanism is vertically as well as longitudinally inclined with respect to the power unit proper. In this case, a helical bevel gear is employed as each of the final gear of the counter gear of the transmission and the final driven gear of the differential gear mechanism. Thus, for gears other than the above-mentioned ones, it is possible to employ almost the same type of gears as conventionally used.

Other objects, features and advantages of the invention will be apparent from the following description of preferred embodiments shown in FIG. 3 thru FIG. 6.

BRIEF DESCRIPTION OF THE DRAWINGS

It is to be noted also that the constituent parts in these drawings corresponding to each other have the same symbols.

DESCRIPTION OF THE PREFERRED EMBODIMENTS

Figure 1:
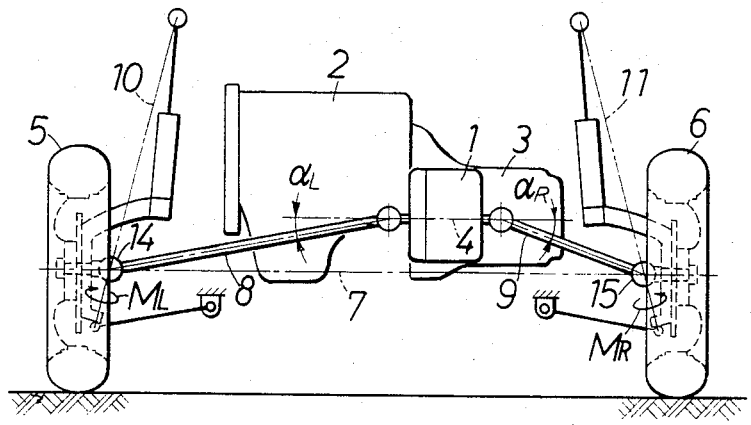
FIG. 1 is a rear elevation of the front wheel part of a conventional front-engine front-drive car having an engine laterally installed, particularly showing its power transmission device.
Figure 2:
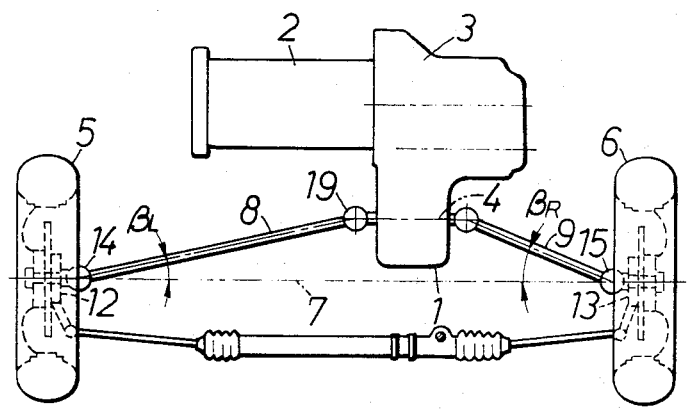
FIG. 2 is a plan view of the power transmission device shown in FIG. 1.
Figure 3:
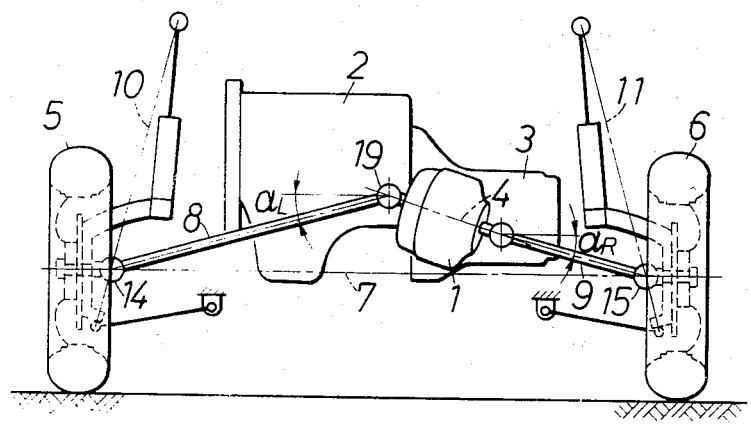
FIG. 3 is a rear elevation of the front wheel part of a front-engine front-drive car, showing a preferred embodiment of a power transmission device according to the present invention.
Figure 4:
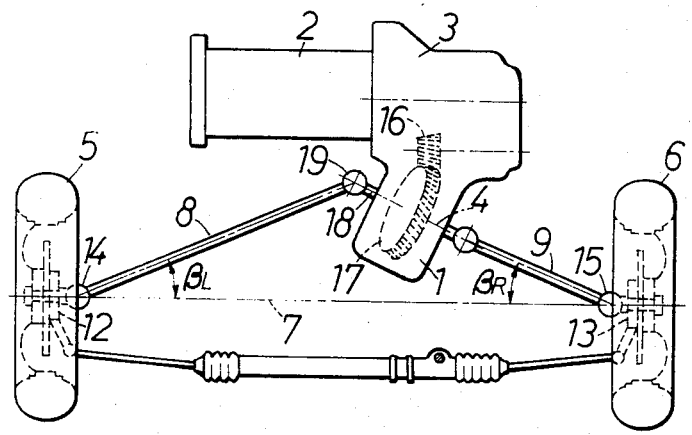
FIG. 4 is a plan view of the power transmission device shown in FIG. 3.

As shown in FIG. 3 and FIG. 4, in a preferred embodiment of the present invention, an engine 2 and a transmission 3 are horizontally as well as laterally installed in the front part of a car similarly to the conventional one. Namely, a power unit proper comprising the engine 2 and the transmission 3 is installed in parallel with a common axis 7 of left and right front wheels 5, 6. An output shaft center line 4 of a differential gear mechanism 1 is downwardly as well as rearwardly inclined toward a shorter drive shaft 9. In order to enable power to be transmitted under such an inclined condition, a helical bevel gear having a relatively small angle is employed as each of a final gear 16 of the counter gear of the transmission 3 and a final driven gear 17 of the differential gear mechanism 1.

Properly selecting the angles of these gears 16, 17 permits the inclination angle of the output shaft center line 4 of the differential gear mechanism 1 to be set at will. Moreover, by properly selecting the lengths or the like of the drive shafts 8, 9, it is possible to substantially equalize the descent angles $\alpha_L$, $\alpha_R$ of the left and right drive shafts 8, 9 with each other as well as the angles $\beta_L$, $\beta_R$ made between the drive shafts 8, 9 and the axis 7 respectively with each other as viewed in a plan view. In the shown preferred embodiment, an even speed coupling 19 provided between an output shaft 18 and the longer drive shaft 8 is located on the substantially center plane in the longitudinal direction of the car body, and the output shaft 18 and the shorter drive shaft 9 are made to form a straight line, thereby to allow the angles $\alpha_L$, $\alpha_R$ as well as the angles $\beta_L$, $\beta_R$ to be substantially equal to each other respectively.

If the descent angles $\alpha_L$, $\alpha_R$ of the drive shafts 8, 9 respectively are thus made substantially equal to each other, it is possible to substantially equalize the left and right turning moments of the front wheels 5, 6 about kingpin axes 10, 11 generated by means of driving torques when the car is accelerated. Accordingly, rectilinearity of the car is maintained, and it is possible to prevent the steering wheel from being undesirably forcedly turned.

Moreover, if the angles $\beta_L$, $\beta_R$ made between the drive shafts 8, 9 and the axis 7 respectively are made substantially equal to each other as viewed in a plan view, the restrictive conditions placed on the front wheels 5, 6 when they are steered become equal to each other. Therefore, employing even speed couplings 14, 15 corresponding thereto permits sufficient utilization of the allowable swing angle ranges of the even speed couplings 14, 15 respectively. Then, since the angle $\beta_R$ made between the shorter drive shaft 9 and the axis 7 as viewed in a plan view becomes smaller than the conventional one, the restriction on the maximum steering angle is reduced, so that the steering wheel turning angle is made larger and consequently the minimum turning radius of the car can be made smaller.

In the case where the allowable swing angle ranges of the even speed couplings 14, 15 respectively are sufficiently large, the angles $\beta_L$, $\beta_R$ are not necessarily made equal to each other. In such a case, it is possible to incline the output shaft center line 4 of the differential gear mechanism 1 only within a vertical plane so as to be parallel with the rotation axis of the final gear 16 of the counter gear as viewed in such a plan view as FIG. 4. In this case, a generally used helical gear can be employed as each of the final gear 16 and the final driven gear 17.

In addition, in the case where the rectilinearity of the car is ensured by other means so that there is no problem of the difference between the turning moments of the front wheels 5, 6 about the kingpin axes 10, 11 generated by driving torques when the car is accelerated, respectively, the descent angles $\alpha_L$, $\alpha_R$ of the left and right drive shafts 8, 9 respectively are not necessarily made equal to each other. In such a case, it is possible to make the output shaft center line 4 of the differential gear mechanism 1 horizontal and inclined only in the logitudinal direction. In this case, a quite ordinary bevel gear can be employed as each of the final gear 16 of the counter gear and the final driven gear 17.

Figure 5:
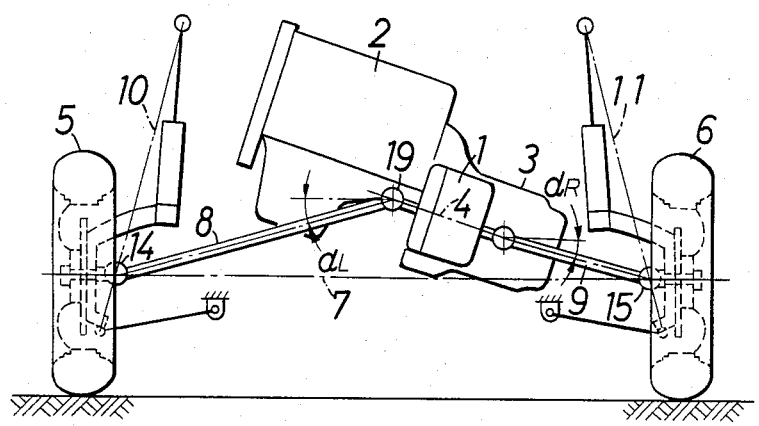
FIG. 5 is a rear elevation of the front wheel part of a front-engine front-drive car, showing another preferred embodiment of the present invention.
Figure 6:
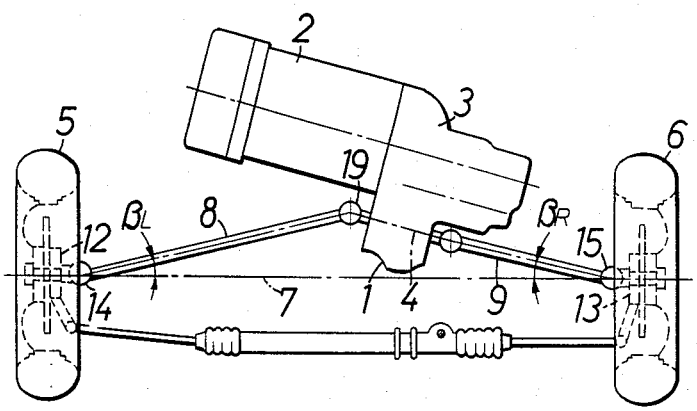
FIG. 6 is a plan view of the preferred embodiment shown in FIG. 5.

Furthermore, as shown in FIG. 5 and FIG. 6, it is also possible to equalize the descent angles $\alpha_L$, $\alpha_R$ of the left and right drive shafts 8, 9 respectively with each other as well as the angles $\beta_L$, $\beta_R$ made between the drive shafts 8, 9 and the axis 7 respectively with each other as viewed in a plan view by vertically as well as longitudinally inclining the power unit proper comprising the engine 2 and the transmission 3, together with the differential gear mechanism 1. In the case where only the angles $\beta_L$, $\beta_R$ need to be made equal to each other, it suffices to incline the engine 2 and the transmission 3 only in the longitudinal direction within a horizontal plane, so that installation is facilitated.

It is also possible to vertically or longitudinally incline the power unit proper and longitudinally or vertically incline the output shaft center line 4 of the differential gear mechanism 1 correspondingly thereto.

What is claimed is:

1. In a front-engine front drive car having a power unit proper including an engine and a transmission installed in a front part of the car, a power transmission device comprising right and left drive shafts of different lengths adapted to be driven by said transmission through a differential gear mechanism having an output shaft, for driving right and left front wheels of said car, respectively, said differential gear mechanism being laterally offset from a central longitudinal axis of said car wherein the one of said right and left drive shafts which is located on the same side of said central longitudinal axis of said car as said differential gear mechanism is axially aligned with respect to the center line of said output shaft of said differential gear mechanism, and the center line of said output shaft of said differential gear mechanism is vertically and longitudinally inclined so that the descent angles of said right and left drive shafts respectively are substantially equal to each other, and the respective angles between said right and left drive shafts and a common axis of said right and left front wheels are made substantially equal to each other as viewed in a plan view.

2. A power transmission device for a front-engine front-drive car as defined in claim 1, wherein said output shaft center line is vertically inclined with respect to said power unit proper.

3. A power transmission device for a front-engine front-drive car as defined in claim 2, wherein a helical gear is employed as each of a final gear of the counter gear of said transmission and a final driven gear of said differential gear mechanism adapted to engage with said final gear.

4. A power transmission device for a front-engine front-drive car as defined in claim 1, wherein said output shaft center line is longitudinally inclined with respect to said power unit proper.

5. A power transmission device for a front-engine front-drive car as defined in claim 4, wherein a bevel gear is employed as each of a final gear of the counter gear of said transmission and a final driven gear of said differential gear mechanism adapted to engage with said final gear.

6. A power transmission device for a front-engine front-drive car as defined in claim 1, wherein said output shaft center line is vertically as well as longitudinally inclined with respect to said power unit proper.

7. A power transmission device for a front-engine front-drive car as defined in claim 6, wherein a helical bevel gear is employed as each of a final gear of the counter gear of said transmission and a final driven gear of said differential gear mechanism adapted to engage with said final gear.

8. In a front-engine front-drive car having a power unit including an engine and a transmission transversely installed in a front part of said car in parallel horizontal and vertical relation with respect to a common rotational axis of the right and left front wheels of said car, a power transmission device comprising right and left drive shafts of different lengths adapted to be driven by said transmission through a differential gear mechanism having an output shaft, for driving said right and left front wheels respectively, said differential gear mechanism being laterally offset from a central longitudinal axis of said car wherein the one of said right and left drive shafts which is located on the same side of said central longitudinal axis of said car as said differential gear mechanism is axially aligned with respect to the center line of said output shaft of said differential gear mechanism, and the center line of said output shaft of said differential gear mechanism is vertically and longitudinally inclined with respect to said common rotational axis of said right and left front wheels whereby the respective vertical angles of declination between said right and left drive shafts with respect to said common rotational axis of said front wheels are made substantially equal and the respective horizontal angles of inclination between said right and left drive shafts with respect to said common rotational axis of said front wheels are made substantially equal.

* * * * *